United States Patent [19]

Hudson

[11] 4,097,086
[45] Jun. 27, 1978

[54] BUS CHAIR PILLOW SLEEPING DEVICE

[76] Inventor: M. Louise Hudson, 3544 Brenton Ave. - Apt. B, Lynwood, Calif. 90262

[21] Appl. No.: 810,421

[22] Filed: Jun. 27, 1977

[51] Int. Cl.² .............................................. A47C 7/62
[52] U.S. Cl. .................................. 297/217; 5/325; 5/337; 297/391; 297/397
[58] Field of Search .......................... 5/325, 337, 338; 297/217, 391, 393, 397

[56] References Cited

U.S. PATENT DOCUMENTS

| 2,986,202 | 5/1961 | Yates | 297/217 |
|-----------|--------|-------|---------|
| 3,578,383 | 5/1971 | Earl  | 297/391 |
| 3,608,964 | 9/1971 | Earl  | 5/338 X |

FOREIGN PATENT DOCUMENTS 20,891 of 12/1890 United Kingdom ................. 297/397

Primary Examiner—James C. Mitchell

[57] ABSTRACT

A bus chair pillow sleeping device for use by travelers in a vehicle, such as a bus, train or airplane, in order that a passenger may rest his head thereupon in a comfortable manner; the pillow device including a hood for fitting over the top of the chair backrest, the hood having straps secured thereto, which attach to a pillow holder containing a pillow, the pillow holder having straps for extending over the person's shoulder for support, and the pillow holder being enclosed within a washable pillow case.

3 Claims, 3 Drawing Figures

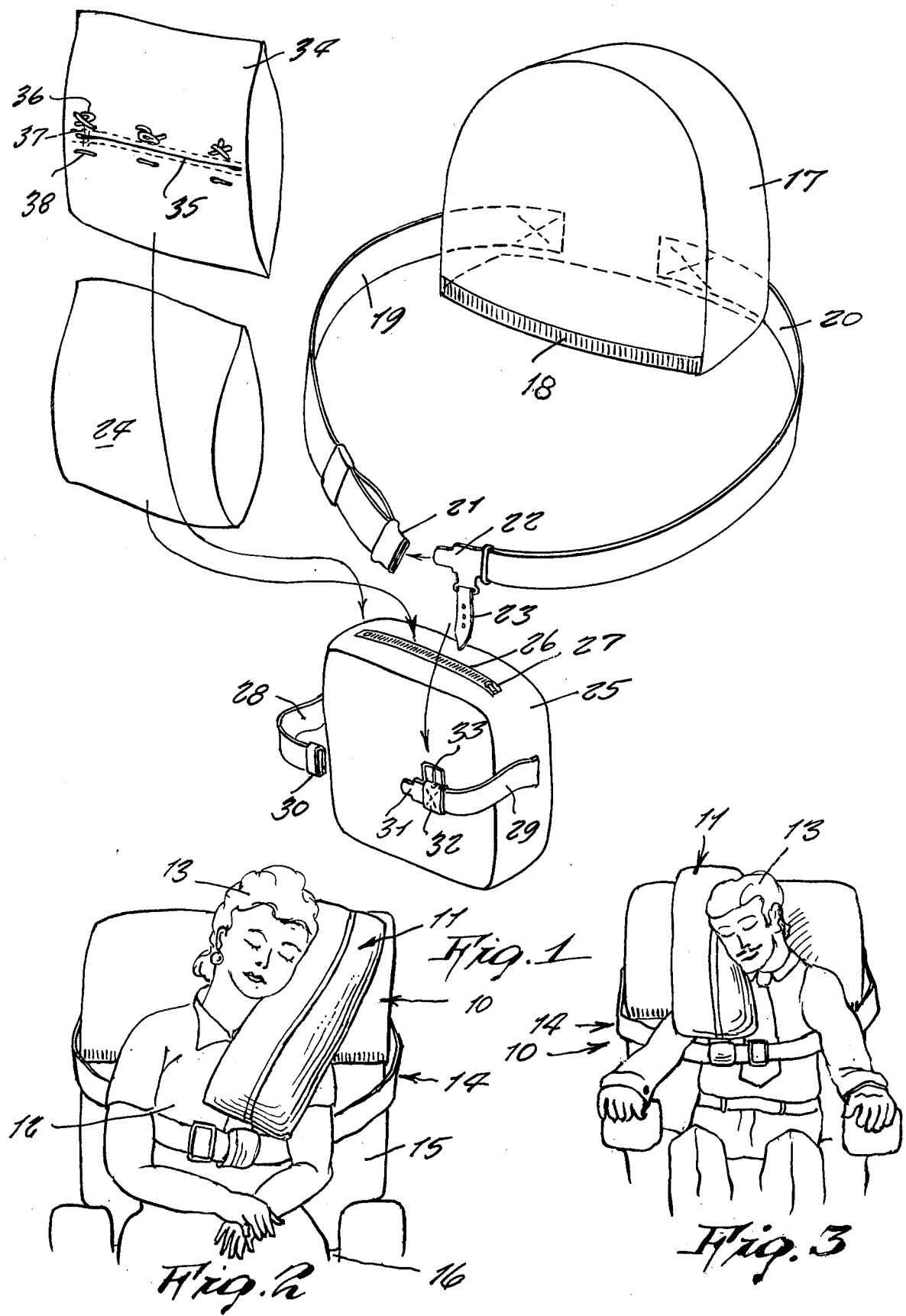

BUS CHAIR PILLOW SLEEPING DEVICE

This invention relates generally to pillows for travelers.

It is generally well-known that, when a person travels in a sitting-up position, in a conveyance such as a bus, train or airplane, it is difficult to obtain a good rest for the person's head, so that the person arrives at his destination often quite tired. This situation in objectionable, and is, therefore, in want of an improvement.

Accordingly, it is the principal object of the present invention to provide a bus chair pillow sleeping device, that makes an ideal head rest for a traveler, because it is completely comfortable.

Another object is to provide a bus chair pillow sleeping device, which is completely adjustable, so as to suit a person to rest his head thereagainst, in any of different positions.

Still another purpose is to provide a bus chair pillow sleeping device, which can be quickly and easily set up for use, and which afterwards can be folded up and put away.

Still another object is to provide a bus chair pillow sleeping device, which takes up a minimum amount of space, so that it can be conveniently carried on and off different public vehicles.

Other objects are to provide a bus chair pillow sleeping device, which is simple in design, inexpensive to manufacture, rugged in construction, easy to use and efficient in operation.

These and other objects will be readily evident, upon a study of the following specification, and the accompanying drawing, wherein:

FIG. 1 is a perspective view, showing the various components of the invention, shown separated;

FIG. 2 is a front view of the present invention, shown installed upon a vehicle chair, and showing a passenger resting her head thereagainst;

FIG. 3 is a similar view, showing a passenger resting his head in a different position upon the device.

Referring now to the drawing in greater detail, the reference numeral 10 represents a pillow device, according to the present invention, wherein there is a pillow assembly 11, against which a person 12 may rest a head 13, the pillow assembly 11 being attached to a support assembly 14, that is supported from a backrest 15 of a vehicle chair 16.

The support assembly 14 includes a hood 17, made of stretchable material at its lower edge 18, in order that it can be easily fitted over the upper end of the backrest 15, and stationarily supported therefrom. A pair of straps 19 and 20 are each secured, at their one ends, to a rear side of the hood 17, the opposite ends of the straps 19 and 20 being attachable together, by means of a buckle 21 engageable with a latch tongue 22. The latch tongue is made of metal, and supports therefrom a short strap 23, for attachment to the pillow assembly 11.

The pillow assembly 11 includes a stuffed pillow 24, which is placeable inside a pillow holder 25, having an opening 26 for receiving the same, the opening 26 being closeable by means of a slide fastener 27. Straps 28 and 29 are secured to opposite ends of the pillow holder. The ends of the straps are securable together, by means of a buckle 30 engaging a latch tongue 31. A loop 32, around the strap 29, carries a buckle 33, which is engageable with the strap 23 of the support assembly.

A pillow case 34 serves to enclose the pillow holder 25, and is made of a washable material, so that it may be kept clean, for placement of the head 13 thereagainst. A slit 35, on the pillow case, allows placement of the pillow holder inside the pillow case. A row of knots 36, upon opposite ends of short strings 37, are receivable within openings 38, on opposite edges of the slit, so as to close the slit 35.

In operative use, as shown in FIGS. 2 and 3, the hood is fitted over the top of the backrest, and the straps 19 and 20 are extended around a person's waist or chest, while seated in the chair 16. The straps 28 and 29 extend up over the person's shoulder, so that the pillow assembly is thus supported therebetween and its attachment to the strap 23. Thus, the pillow assembly is maintained firmly, so as not to slide away, while the person rests a head thereagainst. As shown, the pillow assembly can be adjusted to be used on either side of the person, and can be raised or lowered, as wished, to suit the individual. Thus, greater comfort is provided for a traveler.

While various changes may be made in the detail construction, it is understood that such changes will be within the spirit and scope of the present invention, as is defined by the appended claims.

What I now claim is:

1. A bus chair pillow sleeping device for use by travelers in vehicles, comprising, in combination, a support assembly and a pillow assembly, said support assembly being supportable upon a backrest of a passenger chair, said support assembly having said pillow assembly attached thereto; said support assembly including a hood for fitting over an upper end of said chair backrest, a pair of straps secured at their one ends to a rear side of said hood, opposite ends of said straps being engagable together, and incorporating means for attachment to said pillow assembly, said means comprising a latch tongue on an end of one said strap having a short strap extending at right angle therefrom that engages said pillow assembly.

2. The combination as set forth in claim 1, wherein said pillow assembly includes a stuffed pillow, a pillow holder within which said pillow is receivable, and a pillow case for enclosing said pillow holder, said pillow case having a slit retained closed by a plurality of short strings having a knot at each opposite end thereof.

3. The combination as set forth in claim 2, wherein said pillow holder includes a pair of straps upon opposite ends thereof, said straps being engageable together so as to be extended over a user's shoulder.

* * * * *